United States Patent Office 3,829,525
Patented Aug. 13, 1974

3,829,525
CATALYST COMPOSITION AND ISOPARAFFINIC-OLEFIN ALKYLATION UTILIZING STRONG ACID WITH A SULFONAMIDE
Edward L. Cole, Fishkill, and Frederic C. McCoy, Beacon, N.Y., assignors to Texaco Inc., New York, N.Y.
No Drawing. Filed May 14, 1973, Ser. No. 359,941
Int. Cl. C07c 3/54
U.S. Cl. 260—683.63    16 Claims

ABSTRACT OF THE DISCLOSURE

An alkylation aid of the formula

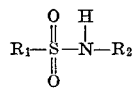

wherein $R_1$ is selected from the group alkyl, aryl and alkyl aromatic; and wherein $R_2$ is alkyl having from about 9 to 20 carbon atoms, for use in strong acid catalyzed reactions wherein alkylatable hydrocarbons are alkylated with alkylating agents. Also, alkylation processes employing such alkylation aids.

BACKGROUND OF THE INVENTION

The present invention relates to an improved alkylation process. In particular, this invention relates to an acid catalyzed reaction wherein an alkylatable hydrocarbon is reacted with an olefin to form, desirably, the 1:1 adduct of such reactants. More particularly, the present invention relates to acid catalyzed reaction of isoparaffin hydrocarbons with olefin hydrocarbons to form highly branched alkylate hydrocarbons suitable for use in the blending of gasoline.

Alkylation processes for reaction of alkylatable hydrocarbons with olefin hydrocarbons are well known and practiced widely upon a commercial basis. Commonly, an alkylatable hydrocarbon such as an isoparaffin or aromatic is reacted in the liquid phase with an olefin hydrocarbon in the presence of a heterogeneous, liquid-phase strong acid catalyst. Of particular commercial importance is the alkylation of low boiling isoparaffin hydrocarbons such as isobutane, isopentane, isohexane, etc. with low boiling olefin hydrocarbons such as propylene, butylenes, and isobutylenes, etc., to form high octane alkylate hydrocarbons suitable for use as gasoline blend stocks. The reactants may not be normally liquid, consequently, superatmospheric pressures are commonly employed to maintain reactants in the liquid phase. Reaction temperatures are preferably in the range of below 0 to 150° F. Strong acid catalysts, such as sulfuric acid fluorosulfonic acid, mixtures thereof, and hydrogen fluoride, are commonly employed and are brought into intimate contact with reactants by agitation or other mixing means. Under such reaction conditions, olefin hydrocarbons tend to react together forming polymer compounds as well as reacting with isoparaffin hydrocarbons to form the desired 1:1 isoparaffin-olefin adduct. Such olefin polymer by-products also tend to crack in the presence of the strong acid catalyst thus forming undesirable low octane light alkylate as well as the equally undesirable high molecular weight heavy alkylate compounds. Additionally, olefin polymers are difficult to separate from the strong acid catalyst and form acid-oil sludges therein. The presence of such acid-oil sludges as well as water in the strong acid catalyst decreases the strength of the strong acid catalyst. Such acid catalyst strength contributes to an increase in undesirable side reactions, such as olefin polymerization as well as decreasing the effectiveness of the acid catalyst for alkylation of isoparaffin with olefins. Desirably, the alkylate product comprises a major portion of the highly branched isomers of the 1:1 isoparaffin-olefin reaction product. For example, in the alkylation of isobutane with butene, trimethylpentanes are the desired product, and in the alkylation of isobutane with propylene, dimethylpentanes are the desired product. Low catalyst acidity due to the presence of acid-oil sludges and water contributes to production of less highly branched alkylate isomers which have lower octane values than more highly branched isomers, and consequently are of less value in gasoline blending. Additionally, cracked olefin polymers contribute substantial amounts of undesirable light and heavy alkylate compounds which have substantially lower octane values than the highly branched 1:1 isoparaffin-olefin adducts.

It is known that surface active compounds may be employed in admixture with the acid catalyst in an alkylation process to improve the production of highly branched 1:1 isoparaffin-olefin adducts at the expense of olefine polymers and the resulting light and heavy alkylate compounds. Also, the use of surface active agents decreases the consumption of acid catalyst in an alkylation process. For example, reference may be made to the following U.S. Patents which describe a variety of surface active compounds which may be used in alkylation processes described herein. Reference U.S. patents are: 2,880,255; 3,551,514; 2,981,772; 3,231,633; 3,364,280; and 3,324,-196. Such surface active agents, disclosed in the preceding patents, are effective for reducing the surface tension of the strong acid catalyst thereby improving contact of the catalyst with reactant hydrocarbons. It is also postulated that perhaps these surface active agents may serve to increase solubility of reactant hydrocarbons within the liquid catalyst phase. As a consequence, such surface active agents must be used with care since relatively small amounts of such surface active agents tend to create stable emulsions of reactant hydrocarbon and acid catalyst under the conditions of agitation and mixing commonly employed in commercial alkylation reactions. Such reactant acid emulsions are difficult to break thus complicating separation of acid catalyst from hydrocarbon effluent of an alkylation process.

SUMMARY OF THE INVENTION

Now, according to the present invention, it has been discovered that alkylation of an alkylatable hydrocarbon with an olefin hydrocarbon in the liquid phase may be substantially improved by employing a liquid alkylation catalyst phase comprising from about 88% to about 98 weight percent $H_2SO_4$ and containing from about 0.0005 to about 0.5 weight percent of a catalyst aid having the formula:

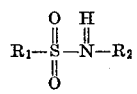

wherein $R_1$ is selected from the group consisting of alkyl, aryl, and alkyl-aromatic and wherein $R_2$ is alkyl having from 8 to 20 carbon atoms.

By following the method of the present invention, production of desirable 1:1 hydrocarbon-olefin reaction products in an alkylation reaction is substantially increased. Also, consumption of acid catalyst within the alkylation reaction is substantially decreased. These and other advantages of the present invention will be more fully disclosed in the detailed description of the invention which follows.

DETAILED DESCRIPTION OF THE INVENTION

Surprisingly, it has been found that certain sulfonamides represented by the formula

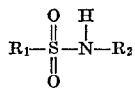

wherein $R_1$ is alkyl, aryl, or alkyl-aromatic, and wherein $R_2$ is alkyl of from 8 to 20 carbon atoms, have properties such that, when added to an alkylation reaction mixture, increased yields of high quality products and lower consumption of alkylation catalyst are experienced.

The mechanism by which these desirable results are obtained is not understood. The prior art teaches that in alkylation reactions wherein the reactants form a heterogeneous liquid phase with a liquid alkylation catalyst, the amount of common surface presented by the two phases contributes to determination of the alkylation reaction rate and quality of products formed in the reaction. Consequently, it is common practice for increasing the surface area, to subject an alkylation reaction mixture to severe agitation to form an emulsion. It is also taught in the prior art to employ surface active agents for decreasing the surface tension between reactant phase and catalyst phase such that emulsions with increased surface may be developed. However, compounds closely related to compounds of the present invention and which have surface active properties, such as N,N'-(di-2-ethylhexyl) benzene sulfonamide, do not improve alkylation reactions in the manner of the compounds of the present invention.

Compounds of the present invention useful as promoters of alkylation reactions are sulfonamides having a relatively long chain alkyl radical attached to the nitrogen of the sulfonamide. Such alkyl radical may have from 8 to 30 carbon atoms and may be either straight or branched chain. Preferably, the alkyl radical is from 10 to 18 carbon atoms in length and particularly preferred is a straight chain alkyl radical of 18 carbon atoms (the octadecyl radical). In addition to the alkyl radical attached to the nitrogen, a hydrocarbon radical is also attached to the sulfur atom. Such hydrocarbon radicals may comprise alkyl, aromatic, or alkyl-aromatic. Hydrocarbon radicals of from about 1 to 7 carbon atoms are preferred with the methyl, phenyl, and tolyl radicals being particularly preferred. The phenyl radical is of highest preference as the hydrocarbon radical attached to the sulfur atom of the sulfonamides of the present invention. Sulfonamide compounds of the present invention may be used as pure compounds or as mixtures of such compounds for achieving the beneficial effects of increased yields, higher quality products, and lower alkylation catalyst consumption. Sulfonamide compounds which are particularly useful in the practice of the present invention include N-(octadecyl) benzene sulfonamide, N-(octadecyl) toluene sulfonamide, N-(octadecyl) methane sulfonamide, N-($C_{10}$–$C_{14}$ alkyl) benzene sulfonamide, and N-($C_{14}$–$C_{15}$ alkyl) benzene sulfonamide. The amount of sulfonamide compounds of the present invention which are employed in an alkylation reaction may be varied from about 0.0005 to about 0.5 weight percent of the catalyst phase employed. At concentrations below about 0.0005, the benefits obtained from such sulfonamides is not substantial. At concentrations above about 0.5 weight percent, suface active characteristics of the sulfonamides become prevalent and emulsions of hydrocarbon reactant and catalyst phase may become difficult to separate.

The present invention is applicable to alkylation reactions, that is reaction of an alkylatable hydrocarbon with an alkylation agent. Alkylatable hydrocarbons include isoparaffin hydrocarbons, aromatic hydrocarbons, cycloparaffin hydrocarbons, etc. Alkylating agents include compounds such as olefins, alcohols, alkyl esters, ethers, alkyl sulfates, and others capable of contributing an alkyl radical to form a 1:1 adduct with an alkylatable hydrocarbon under alkylation reaction conditions. Particularly, the present invention is applicable to those alkylation reactions wherein relatively low molecular weight alkylatable hydrocarbons are reacted with alkylating agents to form alkylate hydrocarbons boiling in the gasoline range. More particularly, the present invention is applicable to alkylation of isoparaffin hydrocarbons of from 4 to 6 carbon atoms, and preferably isobutane, with olefin hydrocarbons of from 3 to 5 carbon atoms, preferably propylene, butylenes, or mixtures thereof.

Olefin hydrocarbons are highly reactive under alkylation conditions and sufficient alkylatable hydrocarbon is provided to react with essentially all the olefins present. Preferably, a substantial excess of alkylatable hydrocarbons is provided to ensure more complete reaction of olefins with the alkylatable hydrocarbons. Molar ratios of isoparaffin to olefin may range from about 1/1 to about 50/1, and molar ratios of about 5/1 to about 20/1 are preferred. In such alkylation processes, reactants are maintained in the liquid phase. Reactants are not necessarily normally liquid, and superatmospheric reaction pressures are employed to maintain such liquid phase. Reaction pressures of from about 10 to 150 p.s.i.g. are preferred, although higher and lower pressures may be used without adverse effect so long as reactants remain in the liquid phase.

Catalysts for alkylation reactions include strong acids such as HF, $H_2SO_4$, fluorosulfonic, mixtures of $H_2SO_4$ and fluorosulfonic, and other strong Brönsted and Lewis acids. Acid catalysts which form heterogeneous liquid phases in the presence of liquid reactants are contemplated in the present invention. While various acid catalysts can be used, strong acid catalysts comprising about 88–98 weight percent $H_2SO_4$ are particularly preferred. When such sulfuric acid catalyst is used, reaction temperatures may range from below 0 to about 150° F. At lower temperatures, reaction rates are slower including side reaction rates which contribute undesirable side products, and at higher temperatures reaction rates increase, particularly the undesirable self-polymerization of olefins. Preferred reaction temperatures for alkylation reactions of isoparaffins with olefins in the presence of sulfuric acid catalyst are in the range of 0–100° F. and especially preferred are temperatures in the range of 20–75° F.

Olefin hydrocarbons, in the presence of acid catalysts, tend to self-polymerize into relatively high molecular weight polymers. The polymers then tend to crack into lower molecular weight hydrocarbons. The polymers and cracked hydrocarbons represent lost yield of desired alkylate product. Also in isoparaffin-olefin alkylation reactions for production of high octane alkylate, olefin polymers and cracked hydrocarbons are particularly undesirable as they are of low octane value and possess a substantial degree of unsaturation. Olefin polymers are difficult to separate from liquid strong acid alkylation catalyst, thus contributing to a decrease in acid strength of such catalyst. Decreased acid strength adversely effects the alkylation reaction, lowering the alkylation reaction rate and increasing formation of less desirable alkylate isomers. Also, reactions occur with the acid to form acid-oils. Consequently, acid is consumed in alkylation reactions in which polymerization and cracking occur as side reactions. In commercial practice, a portion of used catalyst is withdrawn from the alkylation system and replaced with fresh concentrated acid in order to maintain alkylation catalyst at a selected acid concentration. The withdrawn acid, known as spent acid, must then be regenerated or disposed of at considerable expense.

Commonly, commercial alkylation processes are continuous flow operations, although batch operations may also be performed. In a continuous flow process, reactant hydrocarbons and acid catalyst are contacted with agitation in a reaction zone. Reaction zone effluent is separated into a hydrocarbon phase and an acid phase with a portion of the separated acid phase being recycled for contact with additional reactants. If desired, a plurality of alkylation zones may be arranged to receive serial flow of acid phase and/or reactant phase. The isoparaffin is preferably present in substantial excess to olefin reactant, and an isoparaffin stream may be introduced into an alkylation reaction zone for contact with the acid catalyst. The olefin may then be introduced as a liquid or as a gas, and may enter the reaction zone with the isoparaffin, the acid, or may be introduced separately into the reaction mixture present in the reaction zone. The reaction effluent hydrocarbon phase comprises isoparaffin hydrocarbon and contains a substantial amount of alkylate hydrocarbon product. The alkylate hydrocarbon is separated from the isoparaffin in an alkylate recovery section, which may comprise one or more fractional distillation zones and/or other separation means. Preferably, in a commercial process, isoparaffin hydrocarbon separated from the reaction effluent is recycled as reactant to an alkylation reaction zone.

The use of the particular sulfonamides disclosed in the present application as catalyst aids, particularly in sulfuric acid catalyzed alkylation of isoparaffins with olefins, improves yield and quality of product alkylate. The alkylation reaction is promoted, thus additional amounts of 1:1 isoparaffin-olefin adduct is produced and, concomitantly, less olefin polymer and resulting cracked products are produced. Additionally, the formation of highly branched alkylate hydrocarbons is favored over their less highly branched isomers. In production of gasoline range alkylate, the highly branched isomers are preferred since octane number increases with increased branching. With the reduction in polymer and cracked hydrocarbon formation, acid consumption is also substantially decreased. In order to clearly demonstrate these advantages of the disclosed sulfonamides in alkylation reactions, the following specific examples are included. These examples, disclosing specific embodiments of the present invention, are included for the purpose of demonstrating the invention. These examples are not presented in a limiting sense and are not intended to restrict the scope of the invention.

EXAMPLE I

In this example an N-(alkyl) benzene sulfonamide having the following chemical formula was prepared:

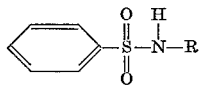

wherein R was an alkyl group having the formula $C_xH_{2x+1}$, and wherein X was from 10 to 14.

This N-$C_{10}$-$C_{14}$ alkyl) benzene sulfonamide was prepared by adding 139 gm. (0.75 mole) of a mixed $C_{10}$-$C_{14}$ alkyl primary amine to a flask containing 125 ml. of 2 N aqueous sodium hydroxide solution. Following addition of the alkylamine, 88 gm. (0.5 gm. mol) of benzene sulfonyl chloride was slowly added to the flask with stirring and cooling in a water bath. The reaction mixture was stirred for 2 hours at 30°–40° C., then diluted with two volumes of pentane and allowed to separate into two liquid layers. The lighter pentane layer was recovered by decantation and was washed with deionized water until the water washings tested neutral. Upon completion of the washing step, the neutral pentane solution was dried by treating with anhydrous $Na_2SO_4$ and the dried pentane solution was transferred to a distillation flask from which substantially all the pentane was distilled at about atmospheric pressure. Finally, excess alkyl amine was distilled overhead at about 1 mm. Hg pressure and a flask temperature of 150° C. The material remaining in the flask substantially comprised the desired N-(alkyl) benzene sulfonamide and had a nitrogen content of 4.1% (theory 4.0) sulfur content of 9.1% (theory 9.9%) and chlorine content of less than 0.03%.

EXAMPLE II

In this example, the N-(alkyl) benzene sulfonamide, having $C_{10}$-$C_{14}$ alkyl groups, prepared in Example I was used to treat a sulfuric acid alkylation catalyst. The sulfuric acid catalyst employed comprised catalyst from a commercial alkylation process refortified with fresh, concentrated, $H_2SO_4$. Separate alkylation runs were made, one using sulfuric acid catalyst treated with N-(alkyl) benzene sulfonamide and the other using untreated sulfuric acid catalyst. In these alkylation runs, isobutane was alkylated with butene-2 and operating conditions and results are shown in Table I, below.

TABLE I

| Run number | 1 | 2 |
|---|---|---|
| Catalyst (percent $H_2SO_4$) | 95.4 | 95.4 |
| N-(alkyl) benzene sulfonamide (wt. percent catalyst) | 0 | 0.11 |
| Isobutane:butene-2 (weight ratio) | 6.4:1 | 6.4:1 |
| Alkylation reaction temperatures (° F.) | 50–53 | 50–53 |
| Butene-2 space velocity (vol. olefin/hr./vol. catalyst) | 0.16 | 0.16 |
| Alkylate composition (wt. percent): | | |
| $C_5$ | 1.8 | 1.7 |
| $C_6$ | 3.4 | 3.7 |
| $C_7$ | 4.5 | 4.6 |
| $C_8$ | 76.2 | 79.7 |
| $C_9$ | 14.1 | 10.4 |
| Trimethyl pentane (wt. percent of alkylate) | 58.9 | 68.7 |
| Alkylate motor octane number (clear) | 92.2 | 94.1 |

From an examination of the results reported in Table I above, it can be seen that an isobutane-butene-2 alkylation reaction employing a small amount of N-($C_{10}$-$C_{14}$ alkyl) benzene sulfonamide produces alkylate of substantially higher quality for use in a motor fuel than an alkylate produced under similar conditions using untreated sulfuric acid catalyst. That is, the alkylate produced using catalyst treated with the N-(alkyl) benzene sulfonamide of the present invention has a substantially increased motor octane number (94.1 vs. 92.2) and has substantially increased $C_8$ hydrocarbon content (79.7% vs. 76.2%) over alkylate produced using catalyst without sulfonamide. In addition, the concentration of desirable trimethyl pentanes in alkylate is substantially increased (68.7% vs. 58.9%) for alkylate produced according to the method of the present invention.

EXAMPLE III

In this example, an attempt was made to duplicate the less-than-ideal conditions often met in commercial operations. Low acidity catalyst (92.3% $H_2SO_4$) was used and temperature excursions of 50 to 70° F. were allowed. Isobutane-butene-2 alkylation runs were made with untreated acid catalyst and with acid catalyst treated with N-($C_{10}$-$C_{14}$ alkyl) benzene sulfonamide. Operating conditions and results are shown in Table II below.

TABLE II

| Run number | 1 | 2 |
|---|---|---|
| Catalyst (percent $H_2SO_4$) | 92.3 | 92.3 |
| N-($C_{10}$-$C_{14}$ alkyl) benzene sulfonamide (wt. percent of catalyst) | 0 | 0.18 |
| Isobutane:butene-2 (weight ratio) | 3.5:1 | 3.5:1 |
| Alkylation temperature (° F.) | 50–70 | 50–70 |
| Butene-2 space velocity (vol. olefin/hr./vol. catalyst) | 0.26 | 0.26 |
| Trimethyl pentane yield (wt. percent of $C_5+$ alkylate) | 33.2 | 35.8 |
| Trimethyl pentane yield (wt. percent of butene-2 charge) | 51.6 | 60.7 |
| Spent acid concentration (wt. percent $H_2SO_4$) | 90.4 | 90.8 |

From Table II it can be seen that use of sulfuric acid catalyst treated with N-($C_{10}$-$C_{14}$ alkyl) benzene sulfonamide produces alkylate containing an increased amount of trimethyl pentanes (35.8% vs. 33.2%) than alkylate produced under similar conditions with untreated sulfuric acid catalyst. Also, yield of trimethyl pentane based upon butene-2 charge, is increased. Additionally, sulfuric acid containing N-($C_{10}$-$C_{14}$ alkyl) benzene sulfonamide was effective to reduce acid consumption, as the sulfuric acid concentration in spent acid recovered from the alkylation reaction effluent was higher (90.8% vs.

90.4%) for the alkylation process employing sulfuric acid catalyst containing N-($C_{10}$-$C_{14}$ alkyl) benzene sulfonamide.

EXAMPLE IV

It is known that certain agents added to a hydrocarbon-acid catalyst alkylation reaction mixture contribute to formation of long lasting foams and emulsions which are undesirable. The experiment of this example was designed to test the effect of N-($C_{10}$-$C_{14}$ alkyl) benzene sulfonamide in a hydrocarbon-acid catalyst mixture.

A sample of a hydrocarbon-acid catalyst alkylation reaction mixture comprising isobutane, sulfuric acid and small amount of butene-2, water and acid polymer oils was treated with N-($C_{10}$-$C_{14}$ alkyl) benzene sulfonamide in an amount equal to 0.5 wt. percent of the sulfuric acid present. This mixture was agitated at about room temperature to produce an emulsion of hydrocarbon and acid catalyst. This emulsion was allowed to stand, and separation of the emulsion was observed to occur rapidly to form a hydrocarbon phase clearly separated from an acid phase. Therefore, N-(alkyl) benzene sulfonamides, at effective concentrations, do not contribute unwanted foaming and emulsifying properties to a hydrocarbon-sulfuric acid catalyst alkylation reaction mixture.

EXAMPLE V

A N-($C_{14}$-$C_{15}$ alkyl) benzene sulfonamide was prepared according to the method of Example I, except a mixture of ($C_{14}$-$C_{15}$ alkyl) primary amines was employed in the synthesis. The N-($C_{14}$-$C_{15}$ alkyl) benzene sulfonamide recovered has the following chemical formula:

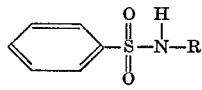

wherein R is an alkyl radical of the formula $C_xH_{2x+1}$ and X is from 14–15.

EXAMPLE VI

In this example the N-($C_{14}$-$C_{15}$ alkyl) benzene sulfonamide of Example V was added to a sulfuric acid alkylation catalyst. Separate alkylation runs were made, one employing sulfuric acid catalyst containing 0.1 wt. percent N-($C_{14}$-$C_{15}$ alkyl) benzene sulfonamide and another employing untreated sulfuric acid catalyst. The sulfuric acid catalyst employed in this experiment, obtained from a commercial alkylation process, was fortified with fresh concentrated sulfuric acid. Operating conditions and comparative results showing the advantage of using sulfuric acid catalyst treated with a small amount of N-($C_{14}$-$C_{15}$) benzene sulfonamide are shown in Table III below.

TABLE III

| Run number | 5 | 6 |
|---|---|---|
| Catalyst (wt. percent $H_2SO_4$) | 95.2 | 95.2 |
| N-($C_{14}$-$C_{15}$ alkyl) benzene sulfonamide (wt. percent of catalyst) | 0 | 0.055 |
| Isobutane:butene-2 weight ratio | 6.4:1 | 6.4:1 |
| Alkylation temperature (° F.) | 45–47 | 45–47 |
| Butene-2 space velocity (vol. olefin/hr./vol. catalyst) | 0.22 | 0.22 |
| Spent alkylation acid concentration | 93.7 | 95.0 |
| $C_5$-$C_8$ alkylate composition (wt. percent): | | |
| $C_5$-$C_7$ | 10.4 | 6.2 |
| $C_8$ | 72.4 | 76.9 |
| Trimethyl pentane (wt. percent of $C_5$-$C_8$ alkylate) | 55.8 | 65.5 |

From Table III it is seen that using 0.055 wt. percent N-($C_{14}$-$C_{15}$ alkyl) benzene sulfonamide in the acid catalyst resulted in a decrease in acid consumption in the alkylation reaction, as evidenced by the higher sulfuric acid concentration (95.0 vs. 93.7 wt. percent $H_2SO_4$) in spent acid containing N-($C_{14}$-$C_{15}$ alkyl) benzene sulfonamide over untreated spent acid. In addition, concentration of desirable $C_8$ hydrocarbons, particularly the high octane trimethyl pentanes, is increased in alkylate produced employing acid catalyst containing 0.055 wt. percent N-($C_{14}$-$C_{15}$ alkyl) benzene sulfonamide.

EXAMPLE VII

N-octadecyl benzene sulfonamide was prepared as follows:

Into 50 ml. of deionized water 5.5 grams sodium hydroxide and 33.6 grams of $C_{18}H_{21}$ ($NH_2$) were added and stirred. To this mixture 22.1 gms. benzene sulfonyl chloride were added with stirring over a ten-minute period. Temperature of the reaction mixture was maintained below 40° C. by use of a water bath. Upon addition of the benzene sulfonyl chloride, the reaction mixture was heated to 75–80° C. to form a homogeneous mixture and was held at this temperature, with stirring for two hours. Upon cooling to room temperature the reaction mixture was mixed with 3 volumes of dimethyl ether and filtered. Filter cake, recovered from the filtration, was charged to a flask with toluene and refluxed at atmospheric pressure to remove water. The dry filter cake-toluene solution was filtered hot for removal of sodium chloride and the filtrate was charged to a stripping column. Toluene was distilled in the stripping column at a temperature of 100° C. and a pressure of 25 mm. Hg. Thirty grams of waxy, hard product substantially comprising N-(octadecyl) benzine sulfonamide was recovered from the stripping column.

EXAMPLE VIII

In this example, the N-(octadecyl) benzene sulfonamide of Example VII was added to a sulfuric acid alkylation catalyst. The sulfuric acid alkylation catalyst comprised used catalyst from a commercial alkylation process refortified with fresh, concentrated sulfuric acid. Two experiments for alkylation of isobutane with butene-2 were then performed, one employing sulfuric acid catalyst containing N-(octadecyl) benzene sulfonamide and another employing untreated sulfuric acid alkylation catalyst. Operating conditions and results are shown in Table IV, below.

TABLE IV

| Run number | 7 | 8 |
|---|---|---|
| Catalyst (wt. percent $H_2SO_4$) | 95.8 | 95.8 |
| N-(octadecyl) benzene sulfonamide (wt. percent of catalyst) | 0 | 0.011 |
| Isobutane:butene-2 (wt. ratio) | 6.6:1 | 6.6:1 |
| Alkylation temperature (° F.) | 47 | 47 |
| Spent alkylation acid concentration | 95.1 | 95.7 |
| Alkylate composition (wt. percent): | | |
| $C_5$ | 2.1 | 1.2 |
| $C_6$ | 4.3 | 2.9 |
| $C_7$ | 4.2 | 3.0 |
| $C_8$ | 72.6 | 86.5 |
| $C_9$+ | 16.8 | 6.4 |
| Alkylate bromine number | 2.0 | 0.81 |
| Trimethyl pentane (wt. percent alkylate) | 61.4 | 78.1 |
| RON (clear) | 94.4 | 97.8 |

As can be seen from Table IV, a very small amount (0.011 wt. percent) of N-(octadecyl) benzene sulfonamide is particularly effective for increasing the desirable $C_8$, and particularly trimethyl pentane, content of an alkylate over an alkylate produced at similar conditions with untreated sulfuric acid catalyst. Also, the degree of unsaturation is reduced and the concentration of undesirable $C_9$+ components is reduced in alkylate produced with sulfuric acid catalyst containing N-(octadecyl) benzene sulfonamide. Additionally, the amount of acid consumed, as reflected by spent acid concentration, is substantially less for an alkylation process using N-(octadecyl) benzene sulfonamide in the acid catalyst. From a comparison of Examples II, V, and VIII, it appears that a smaller amount of N-(octadecyl) benzene sulfonamide is effective for improving alkylate quality and reducing acid consumption than the amounts required of N-($C_{10}$-$C_{14}$ alkyl) benzene sulfonamide and N-($C_{14}$-$C_{15}$) benzene sulfonamide.

EXAMPLE IX

In this example, the effect of increasing amounts of N-(octadecyl) benzene sulfonamide upon the sulfuric acid catalyzed alkylation of isobutane with butene-2. As can be seen from Table V below, addition of a small amount of N-(octadecyl) benzene sulfonamide to acid catalyst improves production of desirable $C_8$ alkylate hydrocarbons, and particularly increases the high octane trimethyl pentanes. As the amount of N-(octadecyl) benzene sulfonamide is increased from 0.006 to 0.016 wt. percent of the sulfuric acid catalyst, the proportion of $C_8$ alkylate and trimethyl pentanes also increases.

Table V is a summary of operating conditions and results obtained in a series of alkylation runs performed using an acid catalyst comprising sulfuric acid catalyst from a commercial alkylation unit refortified with fresh, concentrated sulfuric acid.

TABLE V

| Run number | 9 | 10 | 11 | 12 |
|---|---|---|---|---|
| Catalyst (wt. percent $H_2SO_4$) | 95.8 | 95.8 | 95.8 | 95.8 |
| N-($C_{18}$ alkyl) benzene sulfonamide (wt. percent of catalyst) | 0 | 0.006 | 0.011 | 0.016 |
| Isobutane:butene-2 (wt. ratio) | 6.6/1 | 6.6/1 | 6.6/1 | 6.6/1 |
| Alkylation temp. (° F.) | 47 | 45 | 47 | 45 |
| Butene-2 space velocity (vol. butene/hr./vol. catalyst) | 0.23 | 0.23 | 0.23 | 0.23 |
| Spent alkylation acid (wt. percent $H_2SO_4$) | 95.1 | 94.3 | 95.7 | 95.1 |
| Alkylate composition (wt. percent): | | | | |
| $C_5$ | 2.1 | 1.7 | 1.2 | 1.1 |
| $C_6$ | 4.3 | 3.4 | 2.9 | 2.4 |
| $C_7$ | 4.2 | 3.4 | 3.0 | 2.6 |
| $C_8$ | 72.6 | 82.4 | 86.5 | 88.9 |
| $C_9+$ | 16.8 | 9.1 | 6.4 | 5.0 |
| Alkylate bromine number | 2.0 | 2.0 | 0.8 | 1.2 |
| Trimethyl pentanes (wt. percent of alkylate) | 61.0 | 73.6 | 78.1 | 80.3 |
| Alkylate yield (wt. percent butene consumed) | 153 | 187 | 151 | 142 |

EXAMPLE X

In this example, the utility of employing N-(octadecyl) benzene sulfonamide in a sulfuric acid catalyzed alkylation of isobutane with propylene is demonstrated. Comparative alkylation reactions, at two temperatures (ca. 48° F. and 65° F.) using catalyst comprising sulfuric acid catalyst from a commercial alkylation process refortified with fresh, concentrated sulfuric acid. Operating conditions and results for these comparative runs are shown in Table VI below. As can be seen from Table VI, addition of a small amount of N-(octadecyl) benzene sulfonamide to the sulfuric acid catalyst increases the yield of $C_7$ alkylate, which is the desirable 1:1 alkylation product of isobutane and propylene. Additionally, the undesirable $C_9+$ heavy alkylate components are substantially reduced by use of N-(octadecyl) benzene sulfonamide with the sulfuric acid catalyst.

TABLE VI

| Run number | 13 | 14 | 15 | 16 | 17 |
|---|---|---|---|---|---|
| Catalyst (wt. percent $H_2SO_4$) | 95.4 | 95.4 | 95.4 | 95.4 | 95.4 |
| N-(octadecyl) benzene sulfonamide (wt. percent of catalyst) | 0 | 0.011 | 0 | 0.011 | 0.016 |
| Propylene space velocity (vol. propylene/hr./vol. catalyst) | 0.35 | 0.35 | 0.35 | 0.35 | 0.35 |
| Isobutane/propylene (wt. ratio) | 5/1 | 5/1 | 5/1 | 5/1 | 5/1 |
| Alkylation temp. (° F.) | 47 | 49 | 65 | 65 | 65 |
| Spent catalyst (wt. percent $H_2SO_4$) | 92.7 | 93.3 | 93.8 | 92.9 | 93.3 |
| Alkylate composition (wt. percent): | | | | | |
| $C_5$ | 0.2 | 1.3 | 0.3 | 1.1 | 1.2 |
| $C_6$ | 0.8 | 2.7 | 1.4 | 3.8 | 2.9 |
| $C_7$ | 21.2 | 61.4 | 33.1 | 63.2 | 72.4 |
| $C_8$ | 9.4 | 10.3 | 9.3 | 10.1 | 9.3 |
| $C_9+$ | 68.2 | 24.2 | 55.9 | 22.8 | 14.2 |
| Alkylate bromine number | 3.2 | 1.1 | 1.0 | 1.8 | 1.0 |

EXAMPLE XI

The compound N-(octadecyl) toluene sulfonamide was prepared as follows:

In a flask, 5.5 gm. sodium hydroxide was dissolved in 50 ml. water. To this sodium hydroxide solution, 33.6 gm. (⅛ mole) $C_{18}$ alkyl primary amine and 24.3 gm. of 98% toluene sulfonyl chloride were added with stirring. To this mixture, 50 ml. toluene was added and the mixture heated to reflux for removal of water. Upon drying, the remaining material was filtered hot and the precipitate washed with hot toluene. Filtrate recovered was charged to a rotary evaporator and toluene was removed by heating to 110° C. at 17 mm. Hg. Fifty grams of product, substantially comprising N-(octadecyl) toluene sulfonamide was recovered from the rotary evaporator.

EXAMPLE XII

In this example, the N-(octadecyl) toluene sulfonamide, produced in Example XI above, was utilized as an additive to sulfuric acid alkylation catalyst. Comparative alkylation runs are made wherein isobutane was alkylated with butene-2 in the presence of catalyst comprising sulfuric acid catalyst from a commercial alkylation process refortified with fresh, concentrated sulfuric acid. Operating conditions and results are shown in Table VII below.

TABLE VII

| Run number | 18 | 19 |
|---|---|---|
| Catalyst (wt. percent $H_2SO_4$) | 96.83 | 96.83 |
| N-(octadecyl) toluene sulfonamide (wt. percent of catalyst) | 0 | 0.011 |
| Isobutane/butene-2 (wt. ratio) | 4.9/1 | 4.9/1 |
| Alkylation temperature (° F.) | 45 | 43 |
| Spent catalyst (wt. percent $H_2SO_4$) | 95.17 | 95.34 |
| Alkylate composition (wt. percent): | | |
| $C_5$ | 2.4 | 2.8 |
| $C_6$ | 4.2 | 4.4 |
| $C_7$ | 4.3 | 4.3 |
| $C_8$ | 54.9 | 64.6 |
| $C_9+$ | 34.2 | 24.7 |
| Alkylate bromine number | 0.7 | 2.5 |
| Trimethyl pentanes (wt. percent of alkylate) | 41.8 | 52.0 |

From a comparison of runs 18 and 19 in Table VII it is seen that addition of 0.011 wt. percent N-(octadecyl) toluene sulfonamide to sulfuric acid alkylation catalyst increased the proportion of $C_8$ hydrocarbons, and particularly the high octane trimethyl pentanes, in alkylate produced by alkylating isobutane with butene-2.

EXAMPLE XIII

The compound N-(octadecyl) methane sulfonamide was prepared as follows:

In a flask, 5.5 gm. sodium hydroxide was dissolved in 50 ml. water. To the sodium hydroxide solution, 33.6 gm. (⅛ mole) $C_{18}$ primary amine was added, then 14.3 gm. (⅛ mole) methane sulfonyl chloride was added over a 10 minute period. The reaction mixture temperature rose from 25° C. to 40° C. Upon addition of the methane sulfonyl chloride, 50 ml. toluene was added and the mixture heated at reflux until substantially all the water was removed. The remaining toluene solution was filtered hot for removal of sodium chloride and the filtrate was introduced into a rotary evaporator. Toluene was distilled at 140° C. and 17 mm. Hg. Thirty-nine grams of product, substantially comprising N-(octadecyl) methane sulfonamide was produced.

EXAMPLE XIV

In this example, the N-(octadecyl) methane sulfonamide prepared in Example XIII above was utilized as an additive to sulfuric acid alkylation catalyst. Comparative alkylation runs were made wherein isobutane was alkylated with butene-2 in the presence of catalyst comprising sulfuric acid catalyst from a commercial alkylation process refortified with fresh, concentrated sulfuric acid. Operating conditions and results are shown in Table VIII below.

TABLE VIII

| Run number | 21 | 22 | 23 |
|---|---|---|---|
| Catalyst (wt. percent $H_2SO_4$) | 96.83 | 96.83 | 96.83 |
| N-(octadecyl) methane sulfonamide (wt. percent of catalyst) | 0 | 0.011 | 0.016 |
| Isobutane/butene-2 (wt. ratio) | 4.9/1 | 4.9/1 | 4.9/1 |
| Alkylation temperature (° F.) | 46 | 47 | 45 |
| Spent catalyst (wt. percent $H_2SO_4$) | 95.84 | 96.10 | 95.17 |
| Alkylate composition (wt. percent): | | | |
| $C_5$ | 2.4 | 2.9 | 3.0 |
| $C_6$ | 4.2 | 4.6 | 4.6 |
| $C_7$ | 4.3 | 4.5 | 4.6 |
| $C_8$ | 54.9 | 69.8 | 73.2 |
| $C_9+$ | 34.2 | 18.2 | 2.6 |
| Alkylate bromine number | 0.7 | 0.8 | 2.6 |
| Trimethyl pentane (wt. percent of alkylate) | 41.8 | 59.0 | 61.2 |

From an examination of the data presented in Table VII, it can be seen that use of N-(octadecyl) methane sulfonamid as a sulfuric acid alkylation catalyst increases the proportion of $C_8$ hydrocarbon in the alkylate product with a concomitant reduction of undesirable C$_9$+ heavy alkylate yield. Additionally, the proportion of particularly desirable high octane trimethylpentanes is substantially increased in alkylate produced using sulfuric acid catalyst containing N-(octadecyl) methane sulfonamide. Also, the wt. percent H$_2$SO$_4$ contained in spent acid is increased when N-(octadecyl) methane sulfonamide is present.

EXAMPLE XV

To determine the limits of related compounds which are effective alkylation aids according to the improvement of the present invention, the compound N,N'-(di-2-ethylhexyl) benzene sulfonamide was employed as additive in sulfuric acid alkylation catalyst. In comparative alkylation reactions, the sulfuric acid alkylation catalyst containing N,N'-(di-2-ethylhexyl) benzene sulfonamide showed no activity, over sulfuric acid catalyst alone, for improving the alkylation of isobutane with butene-2.

We claim:

1. In an alkylation process wherein an isoparaffinic hydrocarbon is alkylated with an olefin hydrocarbon in the liquid phase in the presence of a liquid strong acid catalyst; the improvement which comprises:

employing, in the alkylation process, from about 0.0005 to about 0.5 weight percent based on catalyst of a catalyst aid of the chemical formula

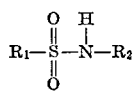

wherein R$_1$ is selected from the group consisting of alkyl, aryl, and alkyl aromatic; and wherein R$_2$ is alkyl having from about 9 to about 20 carbon atoms.

2. The process of Claim 1 wherein the catalyst aid employed is selected from the group consisting of N-(octadecyl) benzene sulfonamide, N-(octadecyl) toluene sulfonamide, N-(octadecyl) methane sulfonamide.

3. An alkylation process wherein isoparaffin selected from the group consisting of isobutane, isopentane, isohexane and mixtures thereof is alkylated with an olefin selected from the group consisting of propylene, butylene, isobutylene, and mixtures thereof, in the liquid phase, in the presence of liquid catalyst comprising from about 88% to about 98% by weight H$_2$SO$_4$ and containing from about 0.0005% to about 0.5% by weight of a catalyst aid having the formula

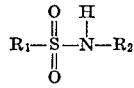

wherein R$_1$ is selected from the group consisting of alkyl, aryl, and alkyl aromatic; and wherein R$_2$ is alkyl having from 8 to 20 carbon atoms.

4. The process of Claim 3 wherein radical R$_1$ of the catalyst aid is selected from the group consisting of methyl, phenyl, and tolyl, and wherein radical R$_2$ is an alkyl having from 10 to 18 carbon atoms.

5. The process of Claim 3 wherein the catalyst aid is selected from the group consisting of N-(octadecyl) benzene sulfonamide, N-(octadecyl) toluene sulfonamide, N-(octadecyl) methane sulfonamide, and mixtures thereof.

6. The process of Claim 4 wherein the isoparaffin is isobutane.

7. The process of Claim 5 wherein the catalyst aid is from about 0.001 to about 0.2 wt. percent of the alkylation catalyst.

8. The process of Claim 7 wherein the isoparaffin is isobutane.

9. An alkylation catalyst comprising from about 88 to about 98 weight percent H$_2$SO$_4$ and containing from about 0.0005 to about 0.5 weight percent of a compound having the formula

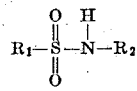

wherein R$_1$ is selected from the group consisting of alkyl, aryl, and alkyl aromatic, and wherein R$_2$ is alkyl of from 8 to 20 carbon atoms.

10. The alkylation catalyst of Claim 9 wherein radical R$_1$ is selected from the group consisting of methyl, phenyl, and tolyl, and wherein radical R$_2$ is alkyl of from 10 to 18 carbon atoms.

11. An alkylation catalyst comprising from about 88 to about 98 weight percent H$_2$SO$_4$ and containing from about 0.0005 to about 0.5 weight percent of a compound selected from the group consisting of N-(octadecyl) benzene sulfonamide, N-(octadecyl)) toluene sulfonamide, N-(octadecyl) methane sulfonamide, and mixtures thereof.

12. The process of Claim 1 wherein the liquid strong acid catalyst is selected from the group consisting of hydrofluoric, sulfuric, fluorosulfonic, and mixtures of sulfuric and fluorosulfonic acids.

13. The process of Claim 1 wherein the liquid strong acid catalyst is hydrofluoric.

14. The process of Claim 1 wherein the liquid strong acid catalyst is sulfuric.

15. An alkylation process wherein isoparaffin selected from the group consisting of isobutane, isopentane, isohexane and mixtures thereof is alkylated with an olefin selected from the group consisting of propylene, butylene, isobutylene, and mixtures thereof, in the liquid phase, in the presence of liquid catalyst selected from the group consisting of hydrofluoric, sulfuric, flurosulfonic, and mixtures of sulfuric and fluorosulfonic acids containing from about 0.0005% to about 0.5% by weight of a catalyst aid having the formula:

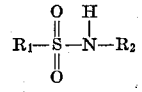

wherein R$_1$ is selected from the group consisting of alkyl, aryl, and alkyl aromatic; and wherein R$_2$ is alkyl having from 8 to 20 carbon atoms.

16. The process of Claim 15 wherein the acid catalyst is hydrofluoric and wherein radical R$_1$ of the catalyst aid is selected from the group consisting of methyl, phenyl, and tolyl, and wherein radical R$_2$ is an alkyl having from 10 to 18 carbon atoms.

References Cited
UNITED STATES PATENTS

| | | | |
|---|---|---|---|
| 2,237,459 | 4/1941 | Thompson | 252—436 |
| 2,416,000 | 2/1947 | Frey | 260—683.51 |
| 2,416,013 | 2/1947 | Matuszak | 260—683.51 |
| 2,981,772 | 4/1961 | Holzman et al. | 260—683.63 |
| 3,231,633 | 1/1966 | Kramer | 260—683.63 |
| 3,324,196 | 6/1967 | Kramer et al. | 260—683.63 |
| 3,364,280 | 1/1968 | Kramer | 260—683.63 |
| 3,551,514 | 12/1970 | Evering | 260—683.63 |
| 3,655,807 | 4/1972 | Rakow et al. | 260—683.63 |
| 3,689,590 | 9/1972 | Rakow et al. | 260—683.63 |
| 2,880,255 | 3/1959 | Davis et al. | 260—683.63 |

DELBERT E. GANTZ, Primary Examiner

G. J. CRASANAKIS, Assistant Examiner

U.S. Cl. X.R.

260—683.51, 683.58; 252—436

O-1050
5/69

UNITED STATES PATENT OFFICE
CERTIFICATE OF CORRECTION

Patent No. 3,829,525　　　　　　　　　Dated　August 13, 1974

Inventor(s)　Edward L. Cole & Frederic C. McCoy

It is certified that error appears in the above-identified patent and that said Letters Patent are hereby corrected as shown below:

Column 2, line 20: Omit [olefine] and insert olefin therefor.

Column 5, line 55: Correct ("N-$C_{10}$-$C_{14}$ alkyl)' to read --N-($C_{10}$-$C_{14}$ alkyl)--

Column 5, line 56: Correct "0.75 mole" to read --0.75 gm. mole--.

Column 7, line 56: In the column for Run 5, correct "95,2" to read 95.2.

Column 8, line 22: Correct "benzine" to read --benzene--.

Column 8, line 48: In the column under Run 7; correct "61.4" to read 61.0.

Column 9, line 24: In the column under Run 10; correct "2.0" to read 2.2.

Column 10, line 20: In the column under Run 19; correct "24.7" to read 24.0.

Signed and sealed this 17th day of December 1974.

(SEAL)
Attest:

McCOY M. GIBSON JR.
Attesting Officer

C. MARSHALL DANN
Commissioner of Patents